(12) United States Patent
Sheafor et al.

(10) Patent No.: US 12,511,247 B2
(45) Date of Patent: Dec. 30, 2025

(54) ENHANCED PERIPHERAL PROCESSING SYSTEM TO OPTIMIZE POWER CONSUMPTION

(71) Applicant: Ambiq Micro, Inc., Austin, TX (US)

(72) Inventors: Stephen James Sheafor, Austin, TX (US); Daniel Martin Cermak, Austin, TX (US); Roger Serwy, Austin, TX (US); Marc Miller, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

(21) Appl. No.: 18/295,180

(22) Filed: Apr. 3, 2023

(65) Prior Publication Data

US 2023/0385214 A1 Nov. 30, 2023

Related U.S. Application Data

(63) Continuation of application No. 17/752,554, filed on May 24, 2022, now Pat. No. 11,620,246.

(51) Int. Cl.
*G06F 13/28* (2006.01)
*G06F 1/3296* (2019.01)
*G06F 13/16* (2006.01)

(52) U.S. Cl.
CPC ............ *G06F 13/28* (2013.01); *G06F 1/3296* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 5,430,847 A | * | 7/1995 | Bradley | G06F 13/4059 710/308 |
| 5,509,138 A | * | 4/1996 | Cash | G06F 12/0653 711/E12.089 |
| 5,701,516 A | * | 12/1997 | Cheng | G06F 12/0866 711/E12.04 |
| 5,960,212 A | * | 9/1999 | Mak | G06F 9/35 710/63 |

(Continued)

FOREIGN PATENT DOCUMENTS

TW 201913290 A 4/2019

OTHER PUBLICATIONS

International Search Report and Written Opinion for PCT/US2023/023252 dated Sep. 20, 2023, 12 pages.

*Primary Examiner* — Michael Sun
(74) *Attorney, Agent, or Firm* — NIXON PEABODY LLP

(57) ABSTRACT

A microcontroller system that includes a central processing unit (CPU), a first system memory, a first peripheral module, and a DMA controller is disclosed. The DMA controller includes a DMA processor, a DMA memory, and a DMA interconnect. The DMA memory stores information associated with the DMA processor. The DMA processor receives a command from the CPU or a signal from a peripheral processor of the first peripheral module that a first data transfer is requested. The DMA processor receives first data from the first system memory or the first peripheral module. The DMA processor, based at least in part on the information stored in the DMA memory, transmits the first data to the first peripheral module or the first system memory, thereby sparing the CPU from managing the transferring of the first data.

20 Claims, 7 Drawing Sheets

(56) References Cited

U.S. PATENT DOCUMENTS

| | | |
|---|---|---|
| 6,697,906 B1 * | 2/2004 | Ayukawa ............ G06F 13/4031 |
| | | 710/316 |
| 6,839,777 B1 * | 1/2005 | Vrancic .................. G06F 13/28 |
| | | 710/52 |
| 8,201,004 B2 | 6/2012 | Anderson |
| 9,703,313 B2 | 7/2017 | Sheafor |
| 9,772,648 B2 | 9/2017 | Sheafor |
| 9,880,583 B2 | 1/2018 | Sheafor |
| 9,939,839 B2 | 4/2018 | Sheafor |
| 10,338,632 B2 | 7/2019 | Hanson |
| 10,578,656 B2 | 3/2020 | Hanson |
| 11,520,499 B1 * | 12/2022 | Cermak ................ G06F 3/0626 |
| 11,790,931 B2 | 10/2023 | Serwy |
| 2002/0091826 A1 * | 7/2002 | Comeau .................. G06F 9/546 |
| | | 709/226 |
| 2002/0174272 A1 | 11/2002 | Fujii |
| 2003/0070011 A1 * | 4/2003 | Naruse .................... G06F 13/28 |
| | | 710/52 |
| 2005/0188119 A1 | 8/2005 | Hayden |
| 2008/0068238 A1 | 3/2008 | Bell |
| 2008/0126612 A1 * | 5/2008 | Barrow .................. G06F 13/28 |
| | | 710/34 |
| 2008/0147907 A1 * | 6/2008 | Triece .................. G06F 13/285 |
| | | 710/22 |
| 2012/0054379 A1 | 3/2012 | Leung |
| 2016/0124878 A1 * | 5/2016 | Pean ........................ G06F 13/28 |
| | | 710/308 |
| 2019/0079573 A1 | 3/2019 | Hanson |
| 2019/0079575 A1 | 3/2019 | Hanson |
| 2021/0271307 A1 * | 9/2021 | Nore ...................... G06F 1/3287 |
| 2022/0130405 A1 | 4/2022 | Serwy |

\* cited by examiner

ENHANCED PERIPHERAL PROCESSING SYSTEM TO OPTIMIZE POWER CONSUMPTION

The present disclosure is a continuation of U.S. application Ser. No. 17/752,554, filed on May 24, 2022. The contents of that application are hereby incorporated by reference in its entirety.

TECHNICAL FIELD

The present disclosure relates generally to a peripheral processing system, and, more specifically, to an enhanced peripheral processing system that optimizes power consumption.

BACKGROUND

In some computer systems, there may be a direct memory access (DMA) that is separate from the processor. A central processing unit (CPU) consumes significant amounts of power when it is operating, and part of that power is used to control operations by the various modules in the peripheral system. The DMA allows main memory access from peripherals on a computer system, independently from the processor. Generally, the DMA is either centralized, or distributed among the peripherals. In low power system on a chip (SoC) systems, a localized DMA is used in conjunction with a module command queue to conserve processor resources. Data analysis is then performed by the CPU.

In many cases, the DMA operation requires additional processing functions, beyond the data transfers, which are commonly executed in the CPU. This requires relatively high energy expenditure to execute the processor. Such expenditure is not desirable in low power states, such as a sleep state. An enhanced peripheral processing system can implement these additional processing functions, and reduce power use for the peripheral operations in deep sleep states of the processor.

SUMMARY

According to certain aspects of the present disclosure, a microcontroller system includes a central processing unit (CPU), a first system memory, a first peripheral module, and a DMA controller. The first system memory is communicatively coupled to the CPU. The first peripheral module is communicatively coupled to a peripheral device. The DMA controller is communicatively coupled to the CPU, the first system memory, and the first peripheral module. The DMA controller includes a DMA processor, a DMA memory, and a DMA interconnect. The DMA memory is communicatively coupled to the DMA processor. The DMA memory is different from the first system memory and stores information associated with the DMA processor. The DMA interconnect is configured to transfer data between the first peripheral module and the first system memory. The DMA processor is configured to receive a command from the CPU or a signal from a peripheral processor of the first peripheral module that a first data transfer is requested. The DMA processor is further configured to receive first data from the first system memory or the first peripheral module. The DMA processor is further configured to, based at least in part on the information stored in the DMA memory, transmit the first data to the first peripheral module or the first system memory, thereby sparing the CPU from managing the transferring of the first data.

According to certain aspects of the present disclosure, a method for data processing using a microcontroller system is disclosed as follows. The microcontroller system includes a CPU, a DMA controller, a plurality of peripheral modules, and a system memory. The method includes receiving first data at a first peripheral module from a first peripheral device. The method further includes transferring the first data, via the DMA controller to a second peripheral module. The method further includes executing the first data, at a peripheral processor of the second peripheral module, to generate second data that is modified from the first data. The method further includes transferring the second data, via the DMA controller to the system memory.

According to certain aspects of the present disclosure, a microcontroller system includes a central processing unit (CPU), a first peripheral module, a second peripheral module, and a DMA controller. The first peripheral module is communicatively coupled to a first peripheral device. The second peripheral module is communicatively coupled to a second peripheral device. The DMA controller is communicatively coupled to the CPU, the first peripheral module, and the second peripheral module. The DMA controller includes a DMA processor, a DMA memory, and a DMA interconnect. The DMA memory is communicatively coupled to the DMA processor. The DMA memory is internal to the DMA controller. The DMA interconnect is configured to transfer data between the first peripheral module and the second peripheral module. The DMA processor is configured to receive a command from the CPU or a signal from a peripheral processor of the first peripheral module that a first data transfer is requested. The DMA processor is further configured to receive first data from the first peripheral module or the second peripheral module. The DMA processor is further configured to, based at least in part on the information stored in the DMA memory, transmit the first data to the second peripheral module or first peripheral module, thereby sparing the CPU from managing the transferring of the first data.

According to certain aspects of the present disclosure, a microcontroller system includes a central processing unit (CPU), a first system memory, a second system memory, and a DMA controller. The first system memory is communicatively coupled to the CPU. The second system memory is communicatively coupled to the CPU. The DMA controller is communicatively coupled to the CPU, the first system memory, and the second system memory. The DMA controller includes a DMA processor, a DMA memory communicatively coupled to the DMA processor, and a DMA interconnect. The DMA memory is different from the first system memory and the second system memory. The DMA interconnect is configured to transfer data between the first system memory and the second system memory. The DMA processor is configured to receive a command from the CPU that a first data transfer is requested. The DMA processor is further configured to receive first data from the first system memory. The DMA processor is further configured to, based at least in part on the information stored in the DMA memory, transmit the first data to the second system memory, thereby sparing the CPU from managing the transferring of the first data.

Additional aspects of the disclosure will be apparent to those of ordinary skill in the art in view of the detailed description of various embodiments, which is made with reference to the drawings, a brief description of which is provided below.

Figure 1:
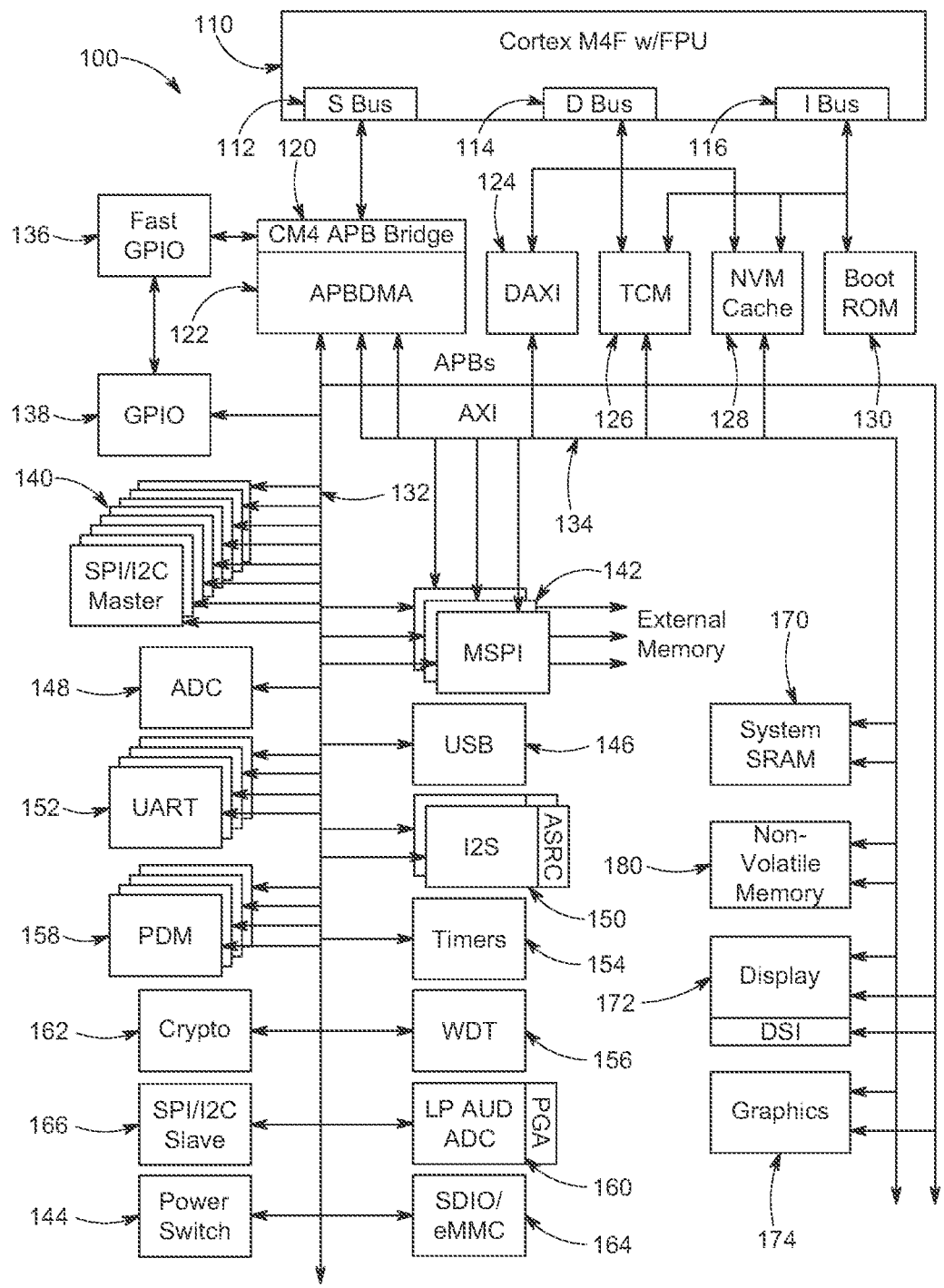
FIG. 1 is a block diagram of a low power microcontroller system, according to certain aspects of the present disclosure.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure relates to a peripheral processing system that can manage transfers among various non-CPU elements, such as peripheral interface modules, internal peripheral modules, volatile and non-volatile memories, high and low speed memories, and other system elements. The disclosed peripheral processing system can have both hard-wired functions and programmable functions. The CPU can load an application into some of the memory, which would cause the peripheral processing system to execute a series of tasks.

In some implementations, an internal peripheral module includes all of the peripheral functionality, such as an internal timer module (e.g., timers 154 in FIG. 1). In contrast, a peripheral interface module (e.g., SPI/I2C 140 in FIG. 1) provides only a connection to a peripheral device, which may be external to the chip. An example of the peripheral device is a sensor, where the sensor is external to the chip; and a peripheral interface module provides a bus (such as SPI) to exchange data with the sensor. The peripheral processing system may include one or more central elements that manage the overall execution, and other local elements that reside as part of each peripheral interface module and control local activity on that module. The local elements can configure their corresponding peripheral modules for optimal power consumption.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

FIG. 1 is a block diagram of an example low power microcontroller system (or microprocessor system) 100. The example low power microcontroller system 100 includes a central processing unit (CPU) 110. The CPU 110 in this example is Cortex M4F (CM4) with a floating point unit. The CPU 110 includes a System-bus (S Bus) interface 112, a Data-bus (D Bus) interface 114, and an Instruction-bus (I Bus) interface 116. It is to be understood, that other types of general CPUs, or other processors (such as digital signal processors (DSPs), graphic processing units (GPUs), or neural processing units (NPUs)) may incorporate the principles described herein.

The System-bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, and the cache 128. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the static random access memory (SRAM) and the Multi-bit Serial Peripheral Interfaces (MSPIs).

One or more Advanced Peripheral Busses (APB) 132 and an Advanced eXtensible Interface (AXI) bus 134 are provided for communication between components on the microcontroller system 100. Each APB 132 is a set of low speed and low overhead interfaces that are used for communicating with peripherals that don't require high performance and don't change often (e.g., when a controller wants to set configuration bits for a serial interface). Multiple APBs are provided to allow parallel transfers to different peripherals. The AXI bus 134 is an ARM standard bus protocol that allows high speed communications between multiple masters and multiple busses. This is useful for peripherals that exchange large amounts of data (e.g., a GPU that talks to a memory and needs to transfer a large amount of graphics data to/from memories).

A fast general purpose input/output (Fast GPIO) module 136 is coupled to the APB bridge 120. A GPIO module 138 provides the physical connection between the system and each of the external pin connections of the microcontroller. The GPIO module 138 is coupled to the fast GPIO module 136. The microcontroller system 100 also includes a plurality of APB busses 132. In this example, an APB bus 132 is coupled to the GPIO module 138. An APB bus 132 is coupled to a series of Serial Peripheral Interface/Inter-Integrated Circuit (SPI/I2C) interfaces 140 and a series of Multi-bit Serial Peripheral Interfaces (MSPIs) 142. The MSPIs 142 are also coupled to the AXI bus 134 and provide access to external memory devices and other high speed peripherals such as display controllers.

An APB bus 132 also is coupled to a universal serial bus (USB) interface 146, an analog to digital converter (ADC) 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Power Switch control module 144, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system static random access memory (SRAM) 170, which is 1 MB in size in this example, is accessible through the AXI bus 134. A Non-volatile Memory (NVM) 180, which may include flash memory, magnetoresistive random-access memory (MRAM), or other NVM technology, is accessible through the AXI bus 134 and provides instruction and configuration data storage for the CPU 110. Since an NVM will typically have a longer access time than static RAM, the cache 128 is typically used to improve the performance of the NVM accesses. The microcontroller system 100 includes a display interface 172 and a graphics interface 174 that are coupled to an APB bus 132 and the AXI bus 134.

Components of the disclosed microcontroller system 100 are further described by U.S. Provisional Ser. No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

Figure 2:
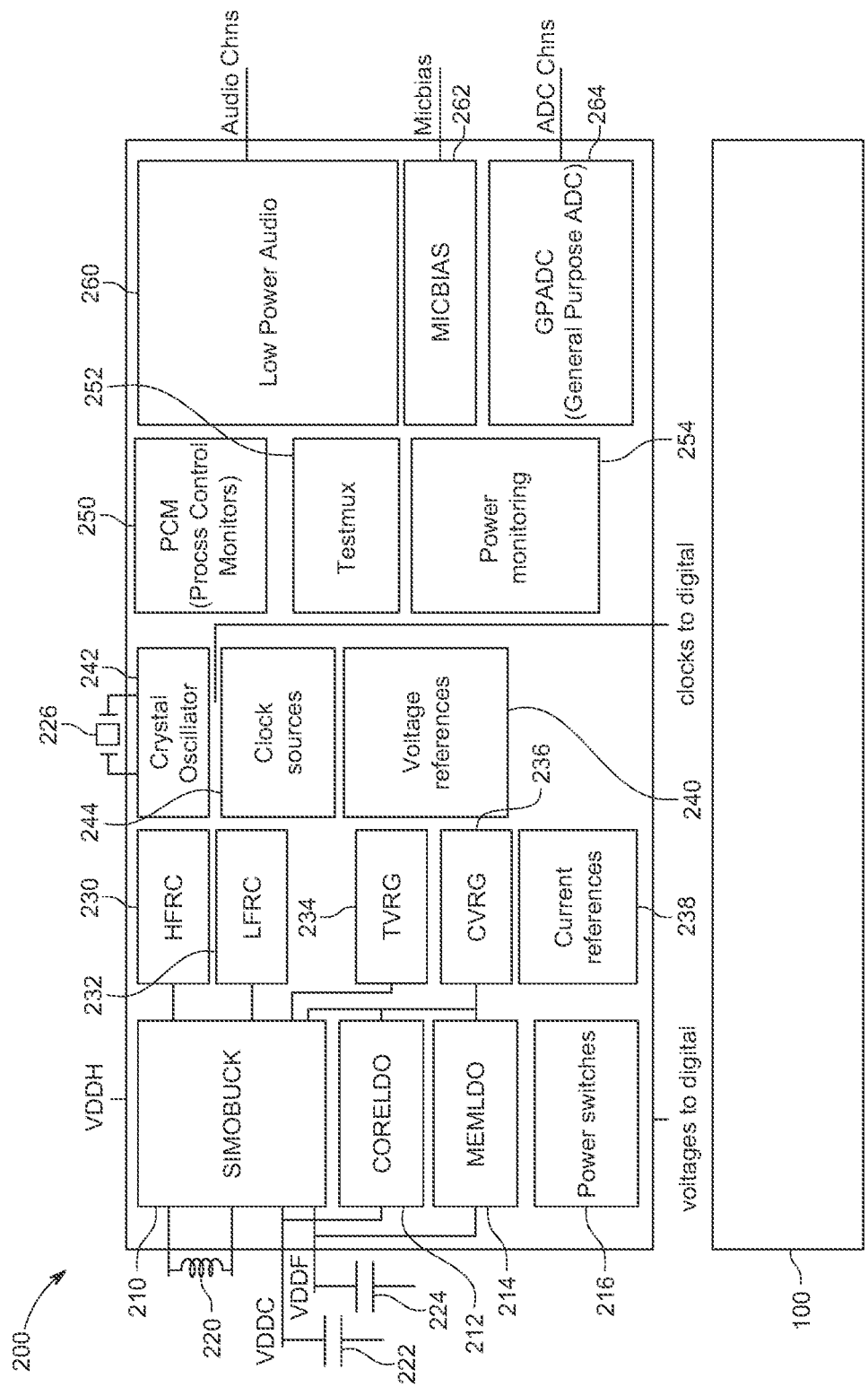
FIG. 2 shows a block diagram of an analog module that interfaces external components with the microcontroller system of FIG. 1, according to certain aspects of the present disclosure.

FIG. 2 shows a block diagram of an analog module 200 that interfaces external components with the microcontroller system 100 in FIG. 1. The analog module 200 supplies power to different components of the microcontroller system 100, as well as providing clocking signals. Energy efficiency is realized by selective switching of different power sources to components of the microcontroller system 100 as needed. Energy efficiency is also realized by use of different clock sources to different components of the microcontroller system 100.

The analog module 200 includes a Single Inductor Multiple Output (SIMO) buck converter 210, a core low dropout (LDO) voltage regulator 212, and a memory LDO voltage regulator 214. The LDO voltage regulator 212 supplies power to processor cores of the microcontroller system 100, while the memory LDO voltage regulator 214 supplies power to volatile memory devices of the microcontroller system 100, such as the SRAM 170. A switch module 216 represents switches that allow connection of power to the different components of the microcontroller system 100.

The SIMO buck converter module 210 is coupled to an external inductor 220. The analog module 200 is coupled to an external Voltage Dipolar Direct Core (VDDC) capacitor 222 and an external Voltage Dipolar Direct Flash (VDDF) capacitor 224. The VDDC capacitor 222 smooths the voltage output of the core LDO voltage regulator 214 and the SIMO buck converter 210. In some implementations, the VDDC capacitor 222 is for filtering only, and does not provide any measurable energy storage. The VDDF capacitor 224 smooths the voltage output of the memory LDO voltage regulator 214 and the SIMO buck converter 210. The module 200 is also coupled to an external crystal 226 to provide clock signals.

The SIMO buck converter 210 is coupled to a high frequency reference circuit (HFRC) 230 and a low frequency reference circuit (LFRC) 232. The HFRC 230 and the LFRC 232 are oscillators that create the internal clocks used in the system. A temperature coefficient voltage reference generator (TVRG) circuit 234 is coupled to a chip temperature sensor, and provides temperature compensation to the SIMO buck converter 210. A calibrated voltage reference generator (CVRG) circuit 236 is coupled to the SIMO buck converter 210, the core LDO voltage regulator 212, and the memory LDO voltage regulator 214. Thus, compensation is performed on the voltage sources 212 and 214. A set of current reference circuits 238 is provided as well as a set of voltage reference circuits 240. These reference circuits 240 provide stable and accurate voltage references, which allows to maintain precise internal voltages when the external power supply voltage changes.

In this example, the LDO voltage regulators 212 and 214 are used to power the microcontroller system 100, and provide power at different voltages to different components. The more efficient SIMO buck converter 210 is used to power different components on the microcontroller system 100, on demand, during normal operation.

The analog block supplies all of the clock signals required by the microcontroller system 100. In this example, three basic clocks are used. A low frequency resistor-capacitor oscillator (or LFRC) 232 operates at very low power, and provides a continuously running clock, which is used when the microcontroller is in a low power sleep state. A crystal oscillator 242, coupled to an external crystal 226, provides a very high accuracy clock, which is used by applications requiring precise timing. A high frequency resistor-capacitor oscillator (HFRC) operates at high speed, and provide high speed clocks, which are used by the CPU and other elements of the microcontroller system. The HFRC may be gated to reduce power, or may be completely powered down for even lower power operation. A clock sources module 244 receives all three clocks from the oscillators, and provides many different frequency clocks, which are selectively coupled to the microcontroller system 100.

The analog module 200 also includes a process control monitoring (PCM) module 250 and a test multiplexer (Testmux) 252. Both the PCM module 250 and the test multiplexer 252 allow testing and trimming of the microcontroller system 100 prior to shipment. The PCM module 250 includes a test structure that allows programming of the compensation voltage regulator 236. The test multiplexer 252 allows trimming of different components on the microcontroller system 100. The analog module 200 includes a power monitoring module 254 that allows power levels to different components on the microcontroller system 100 to be monitored. The power monitoring module 254, in this example, includes multiple state machines that determine when power is required by different components of the microcontroller system 100. The power monitoring module 254 works in conjunction with the power switch module (or power switches) 216 to select one of the power sources (e.g., the SIMO buck converter 210, the core LDO voltage regulator 212, and the memory LDO voltage regulator 214) to supply appropriate power when needed to the components of the microcontroller system 100. The analog module 200 includes a low power audio module 260 for audio channels, a microphone bias module 262 for biasing external microphones, and a general purpose analog to digital converter (GPADC) 264. The GPADC is part of the ADC 148, which is a peripheral module that takes digital data and provides a way for the CPU or the DMA controller to access it.

Figure 3:
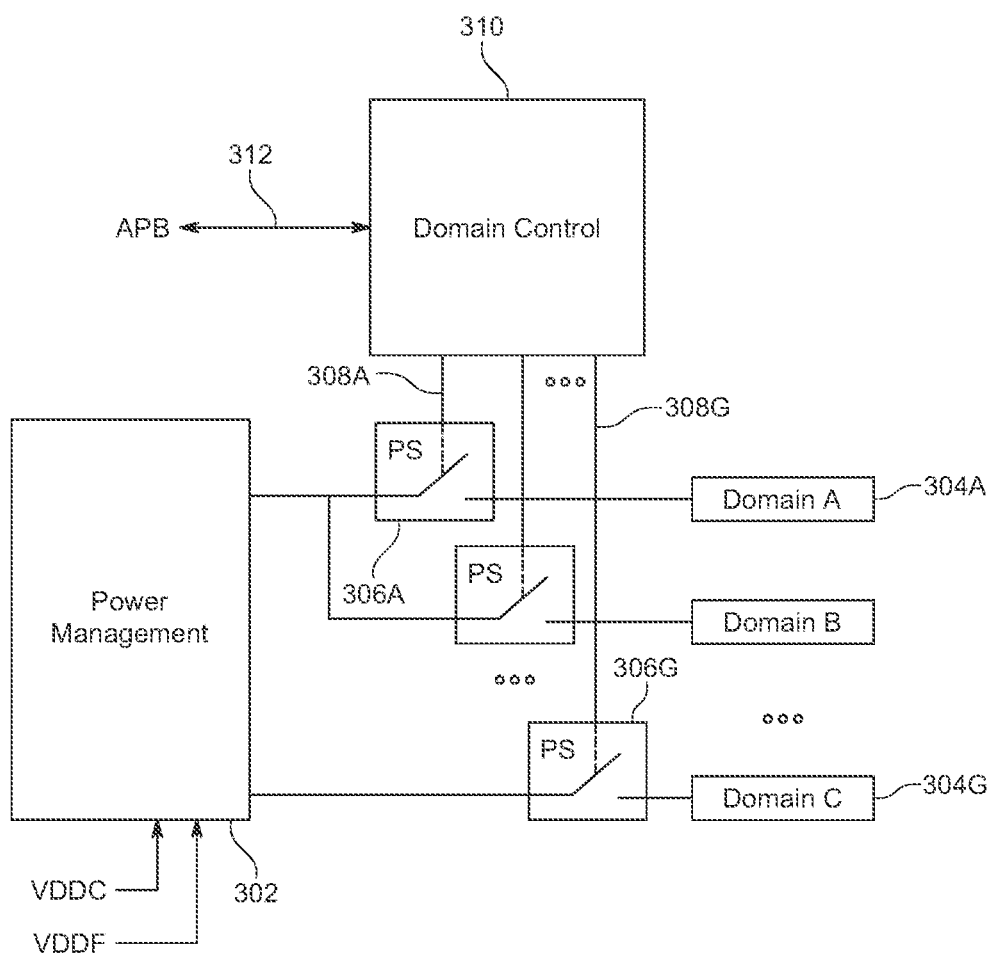
FIG. 3 shows a detailed block diagram of a portion of the analog module of FIG. 2, according to certain aspects of the present disclosure.

FIG. 3 shows a detailed block diagram of the power switches 216 in FIG. 2. The power management module 302 includes the SIMOBUCK 210, CORELDO 212, MEMLDO 214, TVRG 234, CVRG 236, and voltage references 240 in FIG. 2. The power management module 302 receives the power inputs connections VDDC and VDDF in FIG. 2, and produces a set of internal power supplies (Vint1 and Vint2 as examples), which are used to power the internal logic of the microcontroller. Each internal power supply is connected to one or more power domains 304A-304G, each of which contains the logic of a portion of the microcontroller. These portions may include the CPU and/or its subcomponents, peripheral interfaces, blocks of memory, interconnect busses or their subcomponents, and any other component of the system. As such, there is a connection between each power domain 304A-304G and one of the internal power supplies. Each of these connections is made through a power switch (PS) 306A-306G. Each power switch is enabled or disabled by a corresponding control signal 308A-308G from the domain control module 310.

When a power domain (e.g., any of the power domains 304A-304G) is enabled, all of the corresponding internal logic is connected to the power supply and operates normally. When a power domain is disabled, the power supply is disconnected and the corresponding logic within the power domain consumes no power. By enabling the power domains only when necessary, the overall power consumption of the microcontroller may be significantly reduced.

The domain control module 310 selects power domains to be enabled or disabled. The power domains may be directly enabled or disabled by accesses on the APB 312, or the domain control module 310 may be configured to enable or disable a power domain based on signals, such as interrupts, generated by other modules. Any processor in the system, such as the CPU 110, may provide power control information via the APB 312.

Figure 4:
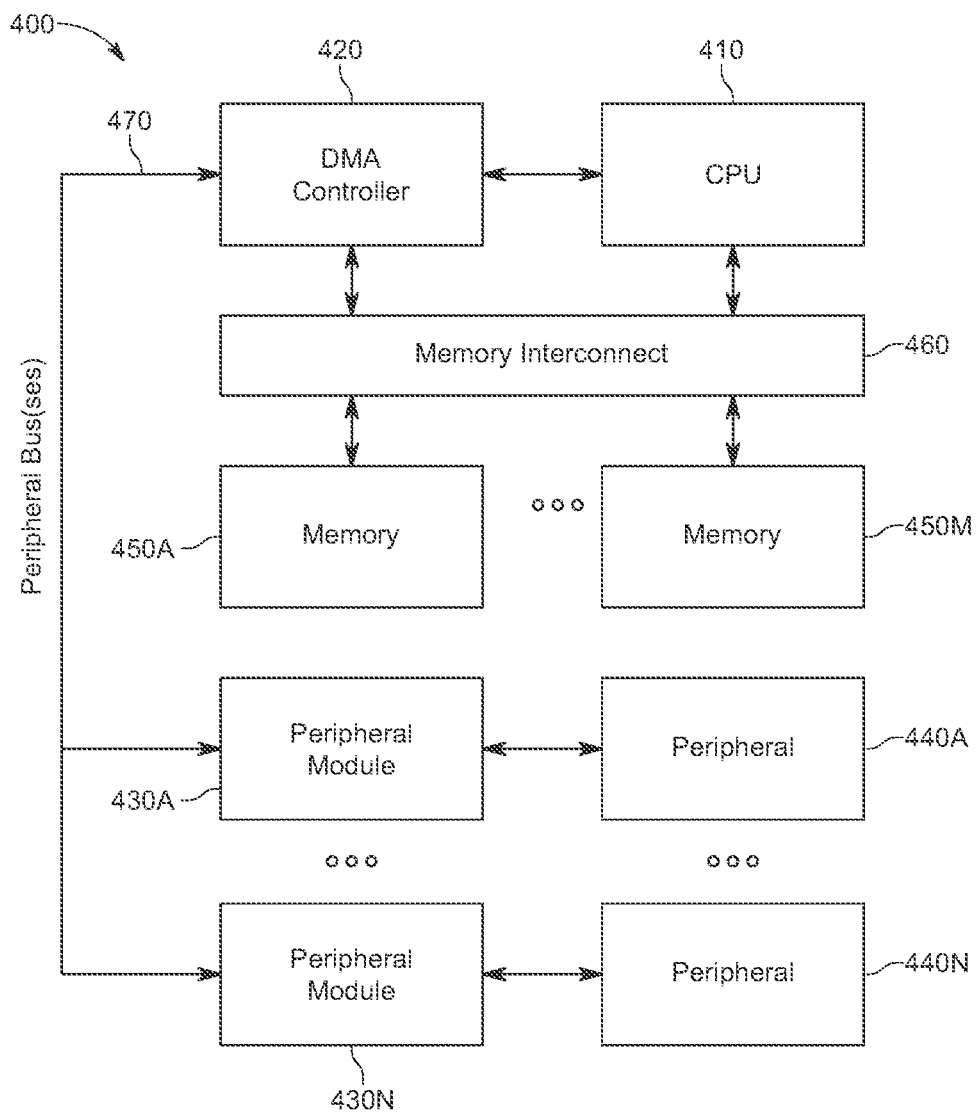
FIG. 4 is shows a top level block diagram of a microcontroller system, according to certain aspects of the present disclosure.

FIG. 4 shows a simplified example of a microcontroller system 400 of the present disclosure. In some implementations, elements of the microcontroller system 400 are the same as, or similar to, corresponding elements of the microcontroller system 100 (FIG. 1), and perform the same or similar functions. The microcontroller system 400 includes a CPU 410, a DMA controller 420, one or more memories (such as memory 450A to memory 450M), and a memory interconnect 460. The CPU 410 is the main processor of the microcontroller system 400. Objectives of the present disclosure relate to utilizing the CPU 410 as little as possible because the CPU 410 typically consumes significant power when active.

In some implementations, the DMA controller 420 of the microcontroller system 400 is the same as, or similar to, the APB DMA 122 of the microcontroller system 100 (FIG. 1); the CPU of the microcontroller system 400 is the same as, or similar to, the Cortex M4F 110 of the microcontroller system (FIG. 1); the memories 450A-450M of the microcontroller system 400 are the same as, or similar to, the system SRAM 170 of the microcontroller system (FIG. 1); the memory interconnect 460 of the microcontroller system 400 is the same as, or similar to, the AXI 134 of the microcontroller system (FIG. 1); the peripheral bus(ses) 470 of the microcontroller system 400 are the same as, or similar to, the APBs 132 of the microcontroller system (FIG. 1); and the peripheral modules 430A-430N of the microcontroller system 400 are the same as, or similar to, many of the APB-connected modules (e.g. 138, 140 and 142) in FIG. 1.

The DMA controller 420 is a module that controls data transfers among other elements of the microcontroller system 400. The microcontroller system as disclosed is advantageous because the DMA controller 420 is configured to offload data transfer from the CPU 410, regardless of whether the CPU 410 is awake or asleep.

In some implementations, the DMA controller 420 manages some or all data transfers through buffers that are local to the DMA controller 420. Additionally or alternatively, in some implementations, the DMA controller 420 manages data transfers directly between the connected modules (e.g., any of the peripheral modules 430A-430N or memories 450A-450M). The DMA controller 420 includes an internal processing element, which may be a state machine, a programmable hardware module, or an actual processor with its own program memory.

The DMA controller 420 manages the data transfer to and from one or more peripheral interface modules (e.g., peripheral modules 430A to 430N). Each of the peripheral modules 430A to 430N contains the logic to interface to its corresponding peripheral device(s), such as one or more peripherals (e.g., peripherals 440A to 440N). Some of the peripherals may reside external to the microcontroller system 400, and some of the peripherals may reside completely internal to the microcontroller system 400. One or more of the peripheral modules 430A to 430N may include an internal processing element to manage data transfers. Such internal processing element may be a state machine, a programmable hardware module, or an actual processor with its own program memory.

Each of the peripheral 440A to peripheral 440N is connected to a peripheral module. For example, the peripheral 440A corresponds to the peripheral module 430A; and the peripheral 440N corresponds to the peripheral module 430N. In some implementations, such as when the connection is a bus such as SPI or I2C, a peripheral module may connect to multiple peripherals. Each peripheral may implement specific functions. For example, the peripheral 440A may be a sensor configured to measure the acceleration of a device that has the microcontroller system 400; and the peripheral 440N may be a set of timers for the system. The system requires time information to schedule events, and can use the set timers to count events or generate precisely timed signals.

The one or more memories (e.g., memories 450A to 450M) are blocks and/or banks of memory that can be read and/or written at addresses defined by the transaction. The one or more memories may be of various types (such as volatile or non-volatile), and typically have different speeds and/or power consumption characteristics among one another. The memory interconnect 460 is a structure that provides paths between other modules (e.g., the CPU 410, the DMA controller 420, the memories 450A-450M) on which data is transferred. The memory interconnect 460 may provide paths between the CPU 410 and the one or more memories. The memory interconnect 460 may also provide paths between the DMA controller 420 and the one or more memories. The memory interconnect 460 may be implemented as a crossbar switch, one or more busses, a set of direct connections, a packet switched network, or any combination thereof.

The DMA controller 420 is capable of managing data transfers between any two connected components (or modules). In this example, the DMA controller 420 can manage: (i) transfers between peripheral modules (430A to 430N) and memories (450A to 450M), (ii) transfers between different peripheral modules (430A to 430N), (iii) transfers between different memories (450A to 450M), and (iv) accesses to and from the CPU 410.

Figure 5:
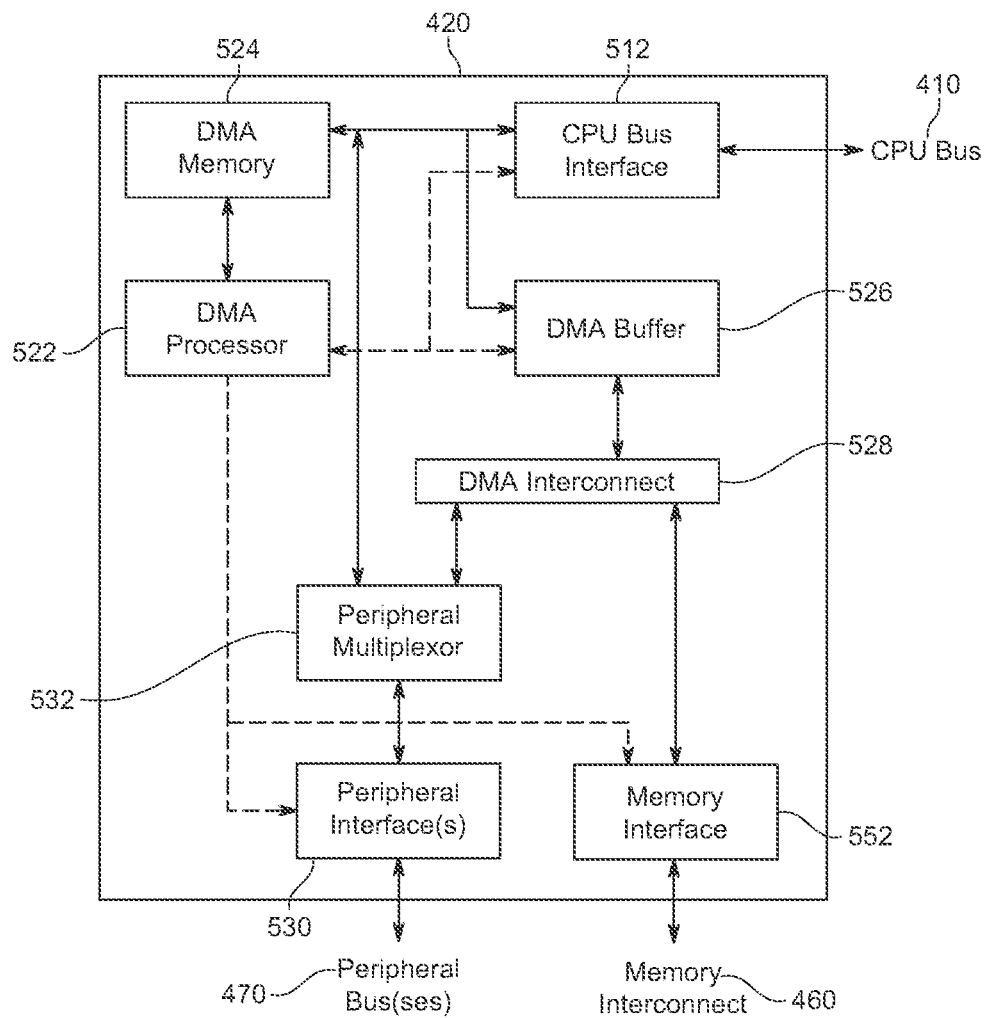
FIG. 5 shows a block diagram of the DMA controller of FIG. 4, according to certain aspects of the present disclosure.

FIG. 5 shows a block diagram of the DMA controller 420. The solid lines indicate paths for data transfer, and the dashed lines indicate paths for control operations (including interrupts). The DMA controller 420 may include a DMA processor 522, a DMA memory 524, a CPU bus interface 512, a peripheral multiplexor 532, a peripheral interface 530, a memory interface 552, a DMA buffer 526, and a DMA interconnect 528.

The DMA processor 522 includes a processing element that controls the operation of the DMA controller 420. The DMA processor 522 may include a programmable state machine, a programmable hardware module, an actual processor, a hard-wired logic function, or any combination thereof. In some implementations, the DMA processor 522 includes a number of autonomous state machines referred to as movement engines (MEs). Each ME can independently manage the transfer of data between any two elements, such as between peripheral modules and/or memories. Each ME has its own set of counters. For example, an ME may contain three counters that hold (i) the address of the data being transferred from a source module, (ii) the address of the location in the destination module to which data is being transferred, and (iii) a count of the number of data elements transferred. The ME also contains a register that holds the total count of data elements to be transferred. All three counters in the ME are incremented when a data element is transferred; and the operation is terminated when the transfer counter (i.e., counter (iii) as described above) equals the total count in the register. A ME may also implement more sophisticated transfer control, for example modifying the transfer operation based on Quality-of-Service requirements, security attributes or Network-on-Chip routing information.

The DMA processor 522 utilizes the MEs as resources to implement the actual data transfers. If the transfer is to or from the DMA buffer 526, the MEs will implement a circular buffer to avoid intervention by the DMA processor 522 itself. The ME counters and/or registers may be loaded with values directly from the DMA memory 524, the ME counters and/or registers may be loaded with data fetched from a peripheral module by the DMA processor 522, or they may be loaded directly by a peripheral module requesting the transfer.

The DMA memory 524 is a memory module (or block) that holds the information the DMA processor 522 uses to determine what functions to perform. This information may include (i) instructions to be executed by the DMA processor 522, (ii) configuration information used by the DMA processor 522 to define operations by other elements such as the MEs or command information used to communicate functions to be executed by the DMA processor 522, or (iii) both (i) and (ii). In some implementations, the DMA memory 524 is written only by the CPU 410 (FIG. 4). In other implementations, the DMA memory 524 may additionally or alternatively be written by other processors, such as the DMA processor 522 or a processor in a peripheral module. The DMA memory 524 may include actual memory elements, hardware registers, or both. The DMA memory 524 may be implemented to preserve its contents when the DMA controller 420 is powered down.

The CPU bus interface 512 provides a connection between the DMA controller 420 and the main system CPU 410. Thus, the CPU bus interface 512 allows the CPU 410 to perform read and write operations to the DMA controller 420. The CPU 410 can read and write the DMA memory 524 and the DMA buffer 526, and can also directly read and write any memories or registers addressable on the peripheral bus(ses) 470. The DMA controller 420 may signal the CPU 410 via several signaling mechanisms, including interrupts, events, semaphores, or sideband control signals, to indicate the completion of operations or other statuses.

The peripheral multiplexor 532 is a module (or block) that allows both the CPU 410 and the DMA controller 420 to access the peripherals via the peripheral bus(ses) 470. The peripheral interface 530 provides the physical connection to the peripheral bus(ses) 470. The peripheral interface 530 provides connection between the peripheral modules (e.g., peripheral modules 430A to 430N in FIG. 4) in the system and the DMA controller 420. All data transferred to and from the peripheral modules flows through the peripheral interface 530. The peripheral interface 530 may also allow the DMA controller 420 to manage the power state of each peripheral module, thus powering the corresponding peripheral interface 530 connected to the peripheral module up only when necessary. The power control is implemented using the power switches block shown in FIG. 3, as the DMA processor 522 writes control information into the domain control block 310 via the APB 312 to enable and disable the appropriate power switches 306A-306G.

The memory interface 552 is a module that provides the connection to the memory interconnect 460. The memory interface 552 allows the DMA controller 420 to transfer data into and out of any of the system memories (e.g., the memories 450A to 450M in FIG. 4). The DMA buffer 526 is a block of memory that is local to the DMA controller 420. The DMA buffer 526 provides temporary storage for data being transferred between other modules (e.g., any of the peripheral modules and the memories). The DMA buffer 526 may be one or more banks of actual memory, or implemented in hardware registers such as a First-In-First-Out (FIFO) structure. The DMA buffer 526 may be flexibly configured with multiple buffers to hold data from multiple transactions simultaneously and to support data transfers which occur out of order, allowing interleaved transfers to optimize performance. The DMA interconnect 528 is a local interconnection of the various data busses within the DMA controller 420. The DMA interconnect 528 may be a crossbar switch, one or more busses, a set of direct connections, or any combination thereof. The amount of data transferred per cycle via the DMA interconnect may be different on the various interfaces, and the DMA interconnect may include local storage to assemble or disassemble transfers. As an example, the DMA buffer 526 may store data in 32-bit elements but the memory interface 522 may transfer 512 bits of data per cycle. In this case the DMA interconnect would assemble 16 data elements from the DMA buffer and then transfer them to the memory interface in a single cycle to ensure efficient utilization of the memory/interconnect bandwidth.

In terms of control paths, the DMA processor 522 can initiate operations on (i) the peripheral bus(ses) 470, (ii) the memory interconnect 460, or (iii) both (i) and (ii); and then manages the data path to control the data flow. The DMA processor 522 receives one or more signaling mechanisms from the peripheral interface 530, such as sideband control signals, event triggers, GPIO pulses, and the like, and can then generate a separate signaling mechanism to the CPU 410. Referring briefly to FIG. 4, the DMA controller 420 receives signaling mechanisms from the other modules (e.g., any of the peripheral modules 430A-430N) via the peripheral interface 520 (FIG. 5); the DMA controller 420 then decides when to generate a signaling mechanism to the CPU 410.

In some implementations of the DMA controller 420, the DMA processor 522 is an actual processor that executes instructions held in the DMA memory 524. The CPU 410 loads the program and some configuration information into the DMA memory 524. This information generally remains unchanged until the CPU 410 selects a new configuration for the DMA controller 420, although the information may also be dynamically changed by other elements such as peripheral processors. The sequence can also be dependent on conditionals within the "program" itself (like a branch) or compared on a set of flags set by other hardware blocks (pause/resume, jump, branch, end). The DMA processor 522 begins executing the instructions, and continuously examines one or more locations in the DMA memory 524 to see if a command has been loaded. When the CPU 410 needs the DMA controller 420 to execute a data transfer, the appropriate command is written to the DMA memory 524. The DMA processor 522 detects this command and initiates a transfer using one of the MEs. The command may specify a complex series of transfers, and the DMA controller 420 initiates them in sequence until all transfers have been completed. Once all of the transfers are complete, the DMA controller 420 may be configured to generate an interrupt to the CPU 410 informing the code there that the command has completed execution. The DMA processor 522 may also examine signals from other system components and alter its execution accordingly.

In some other implementations, the DMA processor 522 is a hardwired state machine. A peripheral module 430A will be configured by the CPU 410 to execute a DMA transfer, including information such as the address and count values. The peripheral module 430A will request a DMA transfer by writing control registers in the DMA memory 524, and initiate each transfer operation via an interrupt to the DMA processor 522. Once the transfer is complete, the peripheral module 430A will determine when to generate an interrupt to the CPU 410.

Thus, unlike a traditional system, where an interrupt is generated to the CPU when it is received from a peripheral module, in the microcontroller system 400, an interrupt is not always generated to wake the CPU 410 just because the DMA controller 420 received an interrupt. This capability can significantly reduce the number of interrupts received by the CPU 410, which in turn creates a significant power improvement because the CPU 410 must wake up in order to service an interrupt. The operations can be implemented directly by the DMA processor 522, or by MEs initiated by the DMA processor 522.

In some implementations, the DMA controller 420 may be configured to connect to the output of a timer module via one of the peripheral busses 470. This timer output will interrupt the DMA processor 522, so that the DMA controller 420 can remain in a sleep state when not active, and can initiate periodic DMA transfers without interaction with the CPU 410.

Figure 6:
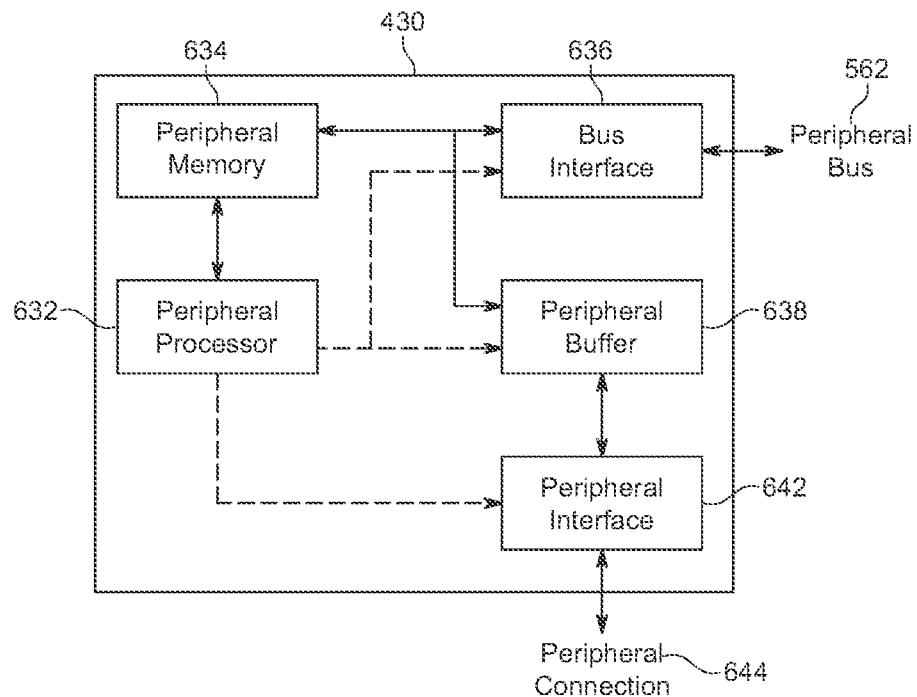
FIG. 6 shows a block diagram of a peripheral module of FIG. 4, according to certain aspects of the present disclosure.

FIG. 6 shows a block diagram of a peripheral module 430 of the microcontroller system 400 (FIG. 4). The peripheral module 430 is the same as, or similar to, any one of the peripheral modules 430A to 430N (FIG. 4). The solid lines indicate paths for data transfer, and the dashed lines indicate paths for control operations (including interrupts). The peripheral module 430 includes a peripheral processor 632, a peripheral memory 634, a bus interface 636, a peripheral buffer 638, and a peripheral interface 642. The peripheral processor 632 includes a processing element that controls the operation of the peripheral module 430. The peripheral processor 632 may be a programmable state machine, a programmable hardware block, an actual processor, a hard-wired logic function, or any combination thereof.

The peripheral memory 634 is a memory that holds the information that the peripheral processor 632 uses to determine what functions to perform. This information may include (i) instructions to be executed by the peripheral processor 632, (ii) configuration information used by the peripheral processor 632 to define operations to be executed on the peripheral connection 644 or command information used to communicate functions to be executed by the peripheral processor 632, or (iii) both (i) and (ii). In some implementations, the peripheral memory 634 is typically written only by the CPU 410 (FIG. 4). In other implementations, the peripheral memory 634 may additionally or alternatively be written by other processors, such as the DMA processor 522. The peripheral memory 634 may include actual memory elements, hardware registers, or both. This peripheral memory 634 may be implemented to preserve its contents when the peripheral module is powered down.

The bus interface 636 provides the connection to one of the peripheral busses 470. The CPU 410 (FIG. 4) and the DMA controller 420 (FIGS. 4-5) may read and write any of the local memory elements (e.g., the peripheral memory 634 and/or the peripheral buffer 638) in the peripheral module 430 via the bus interface 636. In addition, the peripheral processor 632 may transfer data between local memories and the DMA controller 420. The peripheral buffer 638 is local to the peripheral module 430, and provides temporary storage for data being transferred to and from the peripheral module 430. This may be one or more banks of actual memory, or implemented in hardware registers such as a First-In-First-Out (FIFO) structure.

The peripheral interface 642 provides one of two different functions, depending on the type of the peripheral module 430. For peripheral modules that connect to external devices, the peripheral interface 642 controls the signaling and data transfer to and from one or more of the external devices via the peripheral connection 644. An example of such peripheral modules is a SPI/I2C master 140 that creates a standard system peripheral interface (SPI) interconnect used to communicate with multiple external devices. For peripheral modules that include only local functions, the peripheral interface 642 includes all of the internal logic for the local functions and does not include a peripheral connection 644. An example of such a peripheral module is the timers module 154 that includes multiple timers.

In terms of control paths, the peripheral processor 632 can initiate operations on the peripheral interface 642 to external devices or internal functions. This includes reading and writing configuration information to the blocks and managing transfers between the peripheral interface 642 and the peripheral buffer 638. The peripheral processor 632 can detect state changes in the ongoing process, such as the completion of a block data transfer, and may then initiate another operation based on the information in the peripheral memory 634. The peripheral processor 632 can selectively generate interrupts to the DMA controller 420 (FIGS. 4-5) via the bus interface 636. The peripheral processor 632 can inform the DMA controller 420 when a transfer is requested, or alternatively transfer data directly between the local peripheral buffer 638 and the DMA buffer 526 (FIG. 5).

In some implementations, a peripheral module 430 can be configured to connect to the output of a timer module via the connected peripheral bus 470. This timer output will interrupt the peripheral processor 632, so that the peripheral module 430 can remain in a sleep state when not active.

In some implementations, the DMA processor 522 may be configured to modify the data being transferred between a peripheral module (such as any of the peripheral modules 430A-430N) and a system memory (such as any of the memories 450A-450M). For example, transfers may occur from multiple sensors connected to multiple peripheral modules to the DMA buffer 526. The DMA processor 522 could then analyze that data and combine the multiple sets of sensor data into a single set of data, which is transferred to a system memory. The DMA processor 522 could also remove data that is not relevant, such as sensor signals below a preconfigured threshold. This would reduce the processing which the CPU 410 needs to perform on the data and hence reduce power.

Similarly, in some implementations, a peripheral processor 632 may be configured to modify the data being transferred between a peripheral device (such as any of the peripherals 441A-440N) and the DMA controller 420. For example, the peripheral processor could analyze data received from a sensor and remove any data values below a threshold. This would reduce the amount of data transferred to the DMA controller 420 and thus reduce power.

Figure 7:
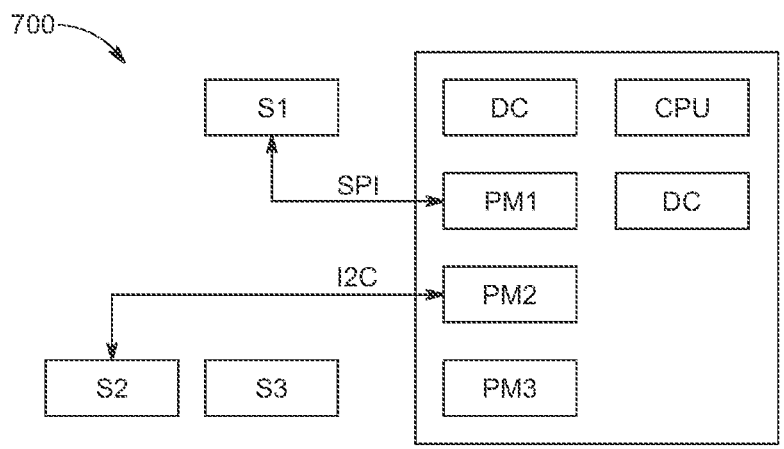
FIG. 7 shows a block diagram of a peripheral processing system, according to certain aspects of the present disclosure.

FIG. 7 shows a block diagram of a peripheral processing system 700 using the disclosed microcontroller system 400. In this peripheral processing system 700, a first peripheral module PM1 creates a serial peripheral interface (SPI), which is used to connect to an external sensor S1. Similarly, a second peripheral module PM2 creates an inter-integrated circuit (I2C) interface, which is used to connect to two external sensors S2 and S3. A third peripheral module PM3 is an internal module, which includes one or more timers. One of these timers in PM3 is used to generate a periodic signal on the peripheral busses used by the peripheral modules to initiate operations. The peripheral modules PM1, PM2, and PM3 may be the same as, or similar to, the peripheral module 430 of the microcontroller system 400.

An example process is disclosed as follows: Every 10 ms, sensor data is read from each of the three sensors (S1, S2, S3). Every 100 ms, this data is aggregated, and the system determines any indicated actions (e.g., respond to a gesture, display a parameter such as steps, etc.) In many existing systems, this process would require the CPU to receive an interrupt and wake up three times (i.e., one time for each sensor S1, S2, S3) every 10 ms, or 30 times in each 100 ms iteration. The disclosed microcontroller system 400 reduces this process to a single interrupt in that period, as described in the process below.

(1) The CPU 410 loads the program memory of the DMA controller 420 and the peripheral (e.g., 440A) with the desired command sequence, and goes to sleep.

(2) The first peripheral module PM1 and the second peripheral module PM2 wait for a timer signal from PM3. For example, when this occurs on PM1, the PM1 peripheral processor 632 initiates the specified SPI transfer from sensor S1, writing the data into the PM1 peripheral buffer 638. PM1 then goes to sleep and waits for the next timer event.

(3) Similarly, the peripheral module PM2 initiates an I2C transfer from sensor S2, writing the data into the PM2 peripheral buffer 638. When that operation is complete, PM2 initiates a second I2C transfer from sensor S3, writing the data into the PM2 peripheral buffer 638. PM2 then goes to sleep and waits for the next timer interrupt. Both PM1 and PM2 count the timer interrupts.

(4) This process repeats (2) and (3) until PM1 and PM2 have serviced 10 timer events. At that point, one or both of the peripheral modules PM1 and PM2 interrupt the DMA controller 420.

(5) The DMA controller 420 then transfers all of the data from the peripheral buffers 638 of PM1 and PM2 into the main memory (e.g., one or more of the memories 450A to 450M), through the memory interconnect 460 and the DMA interconnect 528, using two of the movement elements, and interrupts the CPU 410. The CPU 410 then processes the sensor data and takes appropriate action. This is the only point at which the CPU 410 has been awake. The peripheral modules PM1 and PM2, and the DMA controller 420 continue gathering additional sensor data.

(6) Alternatively, the DMA controller 420 could transfer the data from PM1 and PM2 into the DMA buffer 526, and then convert that data into a more compact form by combining data from PM1 and PM2 or by eliminating irrelevant data before transferring the final data to one or more of the memories 450A to 450M. This would allow the CPU 410 to process significantly less data and execute many fewer operations.

As described above, the entire data gathering process occurs without activity from the CPU 410, other than the necessary data analysis. This process utilizing the microcontroller system 400 is extremely efficient from a power perspective, is also very flexible, and can be adapted to many different types of operations.

In some implementations, some data analysis functions may be performed in one or more of the peripheral modules (e.g., the peripheral modules 430A-430N), or the DMA controller 420. For example, the sensor data may have a threshold value below which no meaningful information is contained. The peripheral processor 632 can make comparisons to the threshold value, and only interrupts the DMA controller 420 when the peripheral processor 632 has captured a number of meaningful data elements (and storing timestamps in the peripheral buffer 638). The number of meaningful data elements may be 5, 6, 7, 8, 9, 10, 11, 12, 15, 20, etc. If the sensors rarely see activity, this could significantly reduce the time that the CPU 410 and the DMA controller 420 are active.

In some implementations, the peripheral processor 632 or the DMA processor 422 may be implemented as a general purpose processor which is significantly simpler and uses less power than the CPU. For example, a non-pipelined processor would consume dramatically less power than the CPU, because the non-pipelined processor contains an order of magnitude fewer flip-flops than the pipelined CPU, and thus consumes much less power. Even if this general purpose processor in the modified peripheral module could only run at half or a quarter of the main frequency of the CPU, the processing per unit of energy would be a significant improvement. In some such implementations, a standard, simple processor like an 8051 or a non-pipelined RISC-V may be used as the general purpose processor in the peripheral module. The peripheral modules (e.g., PM1 and/or PM2) in the peripheral processing system 700 can then perform much of the analysis normally handled by the CPU 410 and only interrupts the CPU 410 when absolutely necessary.

In some implementations, the disclosed peripheral modules 430 also implement specific hardware functions, such as audio processing. By using the DMA controller 420 to move blocks of data between such peripheral modules 430, custom reconfigurable audio processing chains may be generated. If different functions are required at different times, this flexibility could reduce power by enabling only the necessary peripheral modules.

Figure 8:
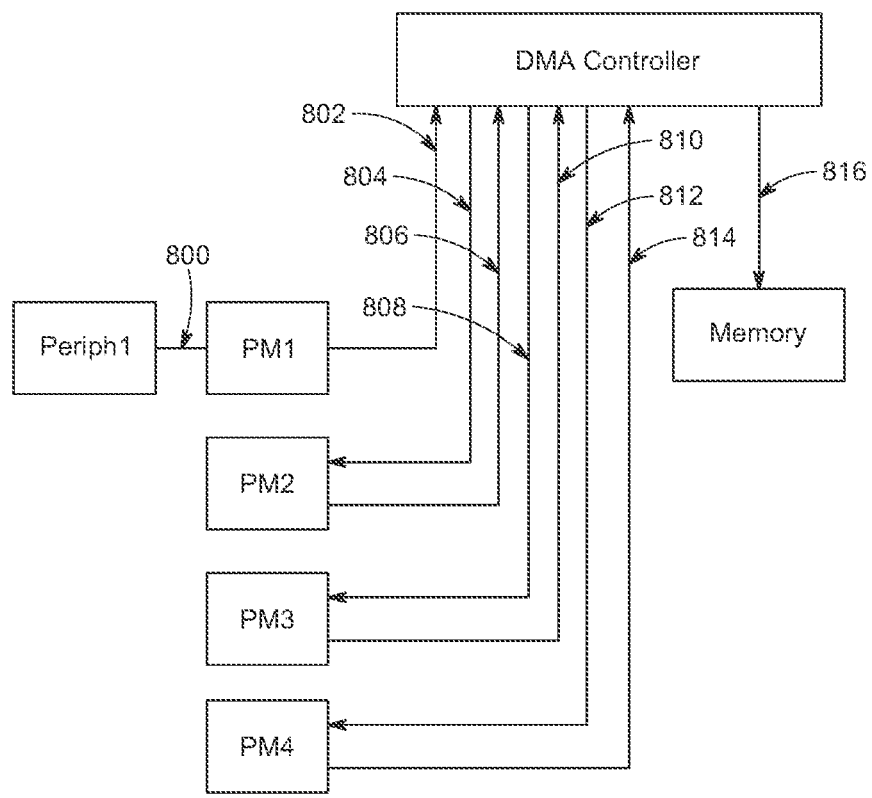
FIG. 8 shows a flow chart of an example data processing flow, according to certain aspects of the present disclosure.

FIG. 8 shows an example of such a process using one or more elements of the microcontroller system 400. Elements of FIG. 8 are the same as, or similar to, elements of FIGS. 4-7, where like reference numerals and labels designate same or equivalent elements. The peripheral module PM1 reads data from an external peripheral Periph1, such as a sensor (transaction 800). The DMA controller 420 transfers this data to the DMA buffer 526 (transaction 802), and then sends it immediately to PM2 (transaction 804). The peripheral processor of PM2 is configured to execute a specific function on the data, and executes this function on the received data and produces a modified block of data. The DMA controller 420 transfers this data to the DMA buffer 526 (transaction 806), and then sends it immediately to PM3 (transaction 808). PM3 executes its configured function on this data and produces another modified block of data. The DMA controller transfers this data to the DMA buffer (transaction 810) and then sends it immediately to PM4 (transaction 812). PM4 processes this data to produce a modified block of data. The DMA controller 420 transfers this data to the DMA buffer 526 (transaction 814), and then transfers this final result to a memory (such as any of the memories 450A-450M) (transaction 816). Since each PM executes a different function on the data, and the peripheral processor 632 in the PM may be dynamically configured to execute functions, it can be seen that this structure allows for a variety of data processing flows to be executed on a stream of data with no CPU involvement.

In some implementations, the DMA controller 420 and/or the peripheral modules 430 can enable and disable power domains, in order to minimize the logic powered at any one time. For example, the power to the buffers and their interface logic may be separated from the remainder of the block in both cases—this would allow a first module (such as the DMA controller 420) to transfer data into the buffer of a second module (such as a peripheral module 430) without requiring the second module to be fully powered. Control of the power switches 216 may be implemented by writing the configuration information to the domain control block 310 (FIG. 3) via the APB 312 connection. Alternatively, the power enabling and disabling may be controller by the domain control block using direct connections such as interrupts.

In some implementations, the DMA processor 522 and the peripheral processor 632 can implement the data structures in the corresponding buffer as circular buffers/FIFOs to enable data transfers much longer than the size of the buffer. The programmability of these processors enables very sophisticated data operations. The FIFO function could be implemented in the code of the relevant processor, or be implemented directly in the hardware of the buffer.

The capability of the DMA controller 420 to manage memory to memory transfers provides the ability to migrate data from higher power memory to lower power memory without involving the CPU 410. This could allow high power memories to be smaller, and therefore use less power. The DMA controller 420 can also implement transfers between peripheral modules 430 without requiring the DMA buffer 526, thus improving latency of such transfers.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A microcontroller system comprising:
a central processing unit (CPU);
a first system memory communicatively coupled to the CPU;
a first peripheral interface module communicatively couplable to a peripheral device;
a peripheral bus coupled to the first peripheral interface module;
a memory interconnect coupled to the first system memory;
a DMA controller communicatively coupled to the CPU, the first system memory via the memory interconnect, and the first peripheral interface module via the peripheral bus, the DMA controller including:
a DMA processor; and
a DMA memory communicatively coupled to the DMA processor, the DMA memory being different from the first system memory and storing information associated with the DMA processor,
wherein the DMA processor is configured to:
receive a signal from the first peripheral interface module over the peripheral bus that a first data transfer is requested;
receive first data from the first system memory over the memory interconnect or the first peripheral interface module over the peripheral bus; and
based at least in part on the information stored in the DMA memory, transmit the first data to the first peripheral interface module via the peripheral bus or the first system memory via the memory interconnect, thereby sparing the CPU from managing the transferring of the first data;
wherein the first peripheral interface module includes:
a peripheral processor, wherein the peripheral processor is configured to analyze the first data and create a modified compressed first data;
a bus interface coupled to the processor and the peripheral bus; and
a peripheral interface coupled to the peripheral processor and communicatively coupled to the peripheral device to exchange data with the peripheral device.

2. The microcontroller system of claim 1, wherein the peripheral processor is configured to remove any data values below a threshold to create the modified compressed first data.

3. The microcontroller system of claim 1, wherein the DMA controller is operable to manage the power state of the first peripheral interface module by controlling power to the peripheral interface connected to the peripheral device.

4. The microcontroller system of claim 1, wherein the first peripheral interface module is configured to be coupled to a plurality of peripheral devices.

5. The microcontroller system of claim 1, wherein DMA processor is further configured to:
receive another signal from the first peripheral interface module over the peripheral bus that a second data transfer is requested;
receive second data from the first peripheral interface module over the peripheral bus; and
based in part on the information stored in the DMA memory, transmit the second data to the first system memory via the memory interconnect.

6. The microcontroller system of claim 1, wherein the DMA processor is further configured to:
detect that the transmitting the first data to the first peripheral interface module or the first system memory is complete; and
send a wake up signal to the CPU in response to the detecting.

7. The microcontroller system of claim 1, wherein the DMA processor is one of a state machine, a programmable hardware module, or a processor with program memory.

8. The microcontroller system of claim 1, wherein the microcontroller system is a system on a chip, and wherein the peripheral device is external to the system on the chip.

9. The microcontroller system of claim 1, wherein the microcontroller system is a system on a chip, and wherein the peripheral device is internal to the system on the chip.

10. The microcontroller system of claim 1, wherein the peripheral device is a sensor and the first data is an output of the sensor.

11. The microcontroller system of claim 1, further comprising a second system memory coupled to the memory interconnect, wherein the first system memory has a different speed or a different power consumption from the second system memory.

12. The microcontroller system of claim 1, wherein the memory interconnect is one of a crossbar switch, a bus, a set of direct connections, a packet switched network, or any combination thereof.

13. The microcontroller system of claim 1, wherein the DMA controller is configured to transfer second data from the peripheral interface module to another peripheral interface module, sparing the CPU from managing the transferring of the second data.

14. The microcontroller system of claim 1, further comprising a plurality of peripheral interface modules, wherein the peripheral interface module is one of the plurality of peripheral interface modules, and wherein the DMA processor includes a plurality of movement engines that can each independently manage the transfer of data between any two of the first system memory, and each of the plurality of peripheral interface modules.

15. The microcontroller system of claim 14, wherein each of the movement engines include a first counter holding the address of the data being transferred from a source module, a second counter holding the address of the location in the destination module to which data is being transferred, and a third counter holding the number of data elements transferred.

16. The microcontroller system of claim 1, wherein the DMA processor modifies the first data.

17. The microcontroller system of claim 16, wherein the first data is one of a plurality of sets of data received from a plurality of peripheral modules, wherein the DMA processor combines the multiple sets of data into a single set of data.

18. The microcontroller system of claim 1, wherein the DMA processor removes part of the first data to create a modified first data.

19. A microcontroller system comprising:
a central processing unit (CPU);
a first system memory communicatively coupled to the CPU;
a plurality of peripheral interface modules each communicatively couplable to a peripheral device;
a memory interconnect coupled to the first system memory;
a peripheral bus coupled to each of the plurality of peripheral interface modules;
a DMA controller communicatively coupled to the CPU, the memory interconnect, and the peripheral bus, the DMA controller including:
a DMA processor configured to:
receive an interrupt from one of the plurality of peripheral interface modules requesting a data transfer via the peripheral bus;
receive data from the first system memory via the memory interconnect or one of the plurality of peripheral interface modules over the peripheral bus; and
transmit the first data to the one of the plurality of peripheral interface modules via the peripheral bus, while the CPU is in a sleep state, wherein each of the peripheral interface modules include:
a peripheral processor, wherein the peripheral processor is configured to analyze the data and create a modified compressed data;
a bus interface coupled to the processor and the peripheral bus; and
a peripheral interface coupled to the peripheral processor and communicatively coupled to the peripheral device to exchange data with the peripheral device.

20. A method for data processing in a microcontroller system including a CPU, a DMA controller, a plurality of peripheral interface modules each couplable to a peripheral device, a peripheral bus coupled to each of the plurality of peripheral interface modules, a memory interconnect, and a system memory coupled to the memory interconnect, the method comprising:

receiving a signal from one of the plurality of peripheral interface modules over the peripheral bus that a data transfer is requested;

the DMA controller receiving data from the system memory or the peripheral interface module over the memory interconnect while the CPU is in a sleep state; and transmitting the data, via the DMA controller to the one of the plurality of peripheral interface modules via the peripheral bus or the first system memory via the memory interconnect, wherein each of the peripheral interface modules include:

a peripheral processor, wherein the peripheral processor is configured to analyze the data and create a modified compressed data;

a bus interface coupled to the processor and the peripheral bus; and a peripheral interface coupled to the peripheral processor and communicatively coupled to the peripheral device to exchange data with the peripheral device.

* * * * *